(12) United States Patent
Firestone

(10) Patent No.: US 7,043,443 B1
(45) Date of Patent: May 9, 2006

(54) METHOD AND SYSTEM FOR MATCHING POTENTIAL EMPLOYEES AND POTENTIAL EMPLOYERS OVER A NETWORK

(76) Inventor: Lisa M. Firestone, 10920 Outpost Dr., North Potomac, MD (US) 20878

( * ) Notice: Subject to any disclaimer, the term of this patent is extended or adjusted under 35 U.S.C. 154(b) by 975 days.

(21) Appl. No.: 09/821,772

(22) Filed: Mar. 30, 2001

Related U.S. Application Data

(60) Provisional application No. 60/193,460, filed on Mar. 31, 2000.

(51) Int. Cl.
   *G06F 9/46*    (2006.01)
   *G06Q 50/00*   (2006.01)

(52) U.S. Cl. ............................................ 705/8
(58) Field of Classification Search ............... 705/7, 705/8
   See application file for complete search history.

(56) References Cited

U.S. PATENT DOCUMENTS 5,117,353 A * 5/1992 Stipanovich et al. .......... 705/1
5,758,324 A * 5/1998 Hartman et al. ............... 705/1

OTHER PUBLICATIONS

Freeman, Firm: impaired doesn't mean impossible, Jun. 13, 1999, Crain's Detroit Business, p.10, [online], [accessed via Dialog file 16: Gale Group PROMT].*

Gonzales, Goodwill branches into job-finding agency in Colorado Springs, Aug. 27, 1998, Kinght-Ridder Tribune Business News, [online], [accessed via Dialog file 20: Dialog Global Reporter].*

Wilson, Job hunter's bargain of the century?, Feb. 10, 2000, Leicester Mercury, [online], [accessed via Dialog].*

Scheid, Employment of individuals with mental disabilities: business response to the ADA's challenge, Jan./Mar. 1999, Behavioral Sciences and the Law, v.17, n.1, p.73-91.*

(Continued)

*Primary Examiner*—Tariq R. Hafiz
*Assistant Examiner*—Tamara L. Graysay
(74) *Attorney, Agent, or Firm*—McDermott Will & Emery LLP

(57) ABSTRACT

A system and method for matching potential employees with potential employers over a network. Potential employers provide position information for one or more job openings over the network to a employee recruitment, job matching and job placement system. Case workers work with potential employees in assessing the potential employees and providing the potential employee's job qualification information, physical and behavioral health information and social needs over the network to the employee recruitment, job matching and job placement system. The employee recruitment, job matching and job placement system compares the information for the potential employee with the position information for at least one job opening and generates a list of job openings and corresponding matching percentages. A matching percentage is the percentage of the received information from the potential employee matches the position information for a job listing of a potential employer. The employee recruitment, job matching and job placement system generates a job placement plan indicating physical rehabilitation accommodations, health education and training needs if applicable for the job listings selected by the potential employee.

26 Claims, 25 Drawing Sheets

OTHER PUBLICATIONS

Ko, The disability index analysis system via ergonomics, expert systems, and multiple attribute decision-making approaches (abstract only), 1994, University of Houston, v.57/01-B of Dissertation Abstracts International, p.607.*

PR Newswire, Marriott's pathways to independence graduation, Mar. 23, 1998, 9:7, [online], [accessed via Dialog file 20: Dialog Global Reporter].*

M2 Presswire, Saskatchewan government: pilot project removes barriers to employment, Dec. 9, 1997, p.1, [online], [accessed via ProQuest database document ID 25674184].*

PR Newswire, Crestar Bank to lead Virginia business leadership network aimed at increasing employment of people with disablities, Feb. 11, 1998, [online], accessed via ProQuest database document ID 26200659.*

Chalker, Tooling up for ADA, Dec. 1991, HR Magazine, v.36, n.12, p.61-65, 3 pgs.*

Wilhelm, Productive employment of the handicapped: compliance strategies for the Americans with Disabllites Act, 1993 Summer, SAM Advanced Management Journal, v.58, n.3, p.9-15.*

* cited by examiner

Client Demographics

| | | |
|---|---|---|
| Case #: | 1987435670 | Telephone: 215-345-5478 — 312 |
| Client Name: | Susan Brown | DOB: 05/23/1977 — 314 |
| Address 1: | 1904-A South Street | SSN: 0014-54-9204 — 316, 318 |
| Address 2: | Apartment 4-B | Preferred Language: English — 320 |
| City: | Philadelphia | Marital Status: Separated — 322 |
| State: | PA | Gender: Female — 324 |
| Zip: | 10952 | Race: American Indian |
| Lock-In Status: | Currently Locked In | |

302 — Case #
303 — Client Name
304 — Address
306 — State
308 — Zip
310 — Lock-In Status 1. Do you have any dependent children or other dependents?  ● Yes  ○ No  ○ Unknown — 326

Please list them: — 328

| Name | Age — 330 | Relationship — 332 |
|---|---|---|
| Angela Smith | 4 Yrs. | Daughter |
| Bruce Brown | 2 Yrs. | |
| Alicia Brown | 1 Yr. | |

Aunt
Brother
Brother-in-Law
Common-Law Husband
Common-Law Wife
Cousin
Daughter
Daughter-in-Law
Father
Father-in-Law Demographics  Education/Training  Health History  Work History  Insurance/Health

400 Health History

Case #: 1987435670
Name: Susan Brown
Primary Provider: Michael Jones, MD
Health Center: Aetna east Hospital 1. Are you currently under a provider's care? ● Yes ○ No ○ N/A — 409

Name: Michael Jones, MD
   Address 1: 32 South Street
   Address 2: Suite 203
   City: Philadelphia    State [ ▼ ]    Zip 19523
   414 — 1.a. When was you last doctor's visit? 01/05/2000 — 420
   1.b. What was the reason for the visit? Flu — 422

2. Have you required healthcare treatment in the ○ No ○ N/A — 424

Why?    426    Treatment
   Date            Check Up
           428     Vaccination
   Reason          Consult
                   IME
                   Second Opinion
                   Other 3. Do you have a history of any serious illness, such as: — 430

☑ None

Demographics  Education/Training  Health History  Work History  Gov't Assistance  Insurance/Health

FIG. 5A

Insurance/Health Plan Information 430

Case #: 1987435670 — 432
Name: Susan Brown — 434
County: Philadelphia — 436

Current Plan: Aetna Health Plans — 438
Plan Provider Number: 34-321-AB — 440
Provider Type: General Hospital — 442
PCP Name: Michael Jones, MD — 444
Clinic/Hospital group: Aetna Central & Eastern PA — 446

Special Medical Needs:
448 — Asthma
Diabetes
Heart Disease
High Blood Pressure
Kidney Problems
Birth Defects
Cancer
Mental health Problem
Sickle Cell Disease
Medic Visually Impaired — 450

Other Insurance Coverage #1: — 452
Other Insurance Policy #1: — 454
Other Insurance Coverage #2:

Demographics | Education/Training | Health History | Work History | Gov't Assistance | Insurance/Health

FIG. 5B

NewJob Applicant 460

INSURANCE AND HEALTH PLAN INFORMATION

Client Case Number: 23458034
Client Name: Roger J. Carmichael
County: Philadelphia

HEALTH COVERAGE

Plan ID: [Select One: ▼]
Group Number:
Date of Eligibility: [mm/dd/yyyy]
Plan Provider Number:
Other Insurance Coverage #1:
PCP Name:
Clinic or Hospital Group:
Special Medical Needs: 464

⊙ To help us place you in the most appropriat understand the special medical needs you
⊙ Do you have:
  ☐ Asthma
  ☐ Diabetes
462 ☐ Heart Disease
  ☑ Low Back Pain
  ☐ Neck Problems
  ☐ Cancer
  ☐ Birth Defects

LOWER BACK PAIN INVENTORY

Client Case Number: 23458034
Client name: Roger J. Carmichael
County: Philadelphia Do you require lumbar support? ⟵ 466
  ○ Yes  ○ No Has your doctor told you not to? ⟵ 468
  ○ Bend
  ○ Twist
  ○ Light Lifting
  ○ Medium Lifting
  ○ Heavy Lifting
  ○ Sit for prolong periods (over 15 min)
  ○ Sit in vibrating vehicles

500
Government Assistance Summary

Case #: 1987435670 — 502
Name: Susan Brown — 504

1. Are you currently receiving any public assistance? ⊙ Yes ○ No ○ Unknown — 506

| Type — 508 | Agency — 510 | Contact Name — 512 | Case # — 514 | Begin Date — 516 | End Date — 518 |
|---|---|---|---|---|---|
| TANF | | | | | |
| AFDC | | | | | |
| GA | | | | | |
| MA | | | | | |

Demographics    Education/Training    Health History    Work History    Gov't Assistance    Insurance/Health

FIG. 6A

520 Work History

Case #: 1987435670 — 522
Name: Susan Brown — 524

1. What is the last job you had? Circuit City-PC Repair
2. Please describe briefly the job requirements: Repaired laptops and desk tops — 526, 528
3. Did you receive any on the job training to help you? ⦿ Yes ○ No ○ N/A — 530
   PC repair for IBM, Toshiba, and NEC laptops and desk top PCs. — 532
   Please describe:
   - Seasonal Employment
   - No Day Care
   - No Transportation
4. How long did you wo— Laid Off / Down Sizing / Fired / Personal / Other — 534
   From: 05/01/99    2/10/99    Total Time: 7 months — 536
5. Why did you leave? No Day Care — 538
6. Did you have any problems or issues with that job? ○ Yes ⦿ No ○ N/A — 540

Demographics | Education/Training | Health History | Work History | Gov't Assistance | Insurance/Health

FIG. 6B

Education and Training — 542

Case #: 1987435670
Name: Susan Brown 544
546

1. What is the highest school grade you have completed? [12▼] — 548

2. Did you receive a diploma or other certificate? ⊙ Yes ○ No ○ N/A ○ Unknown — 550
   Please list them:
   | High School Diploma ▼ |
   | Vocational School Certificate ▼ | Computer Opertor |
   | ▼ |
   — 552

3. Have you had any technical training? ⊙ Yes ○ No ○ Unknown — 554
   Please list:
   | ▼ | PCs |
   | Small appliance repair | |
   | Computer Operator | |
   | Switchboard Operator | |
   — 556

4. Have you received ○ Yes ○ No ⊙ Unknown — 558
   Other
   Please list:
   | ▼ | PC Repair |
   | ▼ | |
   — 560

Demographics | Education/Training | Health History | Work History | Gov't Assistance | Insurance/Health

FIG. 6C

NewJob Applicant

562 back | reset | sign in | contact us | help | become a

PERSONAL INFORMATION

Client Case Number: 23458034 — 564
Client Name: Roger J. Carmichael — 566
County: Philadelphia — 568

How do you keep busy during the day? — 570
[Walk ▼]

Do you have access to a car? — 572
○ Yes  ○ No

Do you live near public transportation? — 574
○ Yes  ○ No

Are you responsible for the care of a child under the age of five? — 576
○ Yes  ○ No  ○ Not Applicable Are you responsible for the care of another adult? — 578
○ Yes  ○ No  ○ Not Applicable How often in the last week have you felt? — 580
[hopeless ▼] ○ None  ○ Some  ○ A lot  ○ Completely

[CONTINUE]

Favorites | History | Search | Scrapbook | Page Holder

FIG. 6D

New Job

2

Company Name: Acme Construction
Location(s): All Locations
Dept/Div/SBU:
Job Title:
Data Available:

802
804
806
808
810

Please select the description below which most closely resembles the physical requirements of the position: — 812

○ Lift up to 10 pounds occasionally (less than 35% of time). sit most of the time ○ Lift up to 10 pounds occasionally sit most of the time ○ Lift up to 20 pounds frequently (36% 10 pounds frequently (36%) standing to a significant deg ○ Lift up to 50 pounds occasi 20 pounds frequently (36% constantly (67% to 100% of ○ Lift up to 100 pounds occas 50 pounds frequently (36% constantly (67% to 100% of back    reset    sign in    contact us    help    become a new us Favorites | History | Search | Scrapbook | Page Holder

FIG. 9B

| Term | Description |
|---|---|
| Very Low | Hands are idle most of the time |
| Low | Frequent pauses, no difficulty keeping up |
| Medium | Steady motion but leisurely pace - no difficulty keeping up |
| High | Hands in rapid steady motion |
| Very High | Constant rapid motion -- difficulty keeping up |

| Action Required ~850 | Body Side ~852 | Frequency ~854 | Pace ~856 |
|---|---|---|---|
| Use foot controls | Left | Rarely (10% of less) | Very Low |
| Reach above shoulder | Left | Occasionally (11%-33%) | Very Low |
| Flex/extend elbow | Right | Not at all | Very Low |
| Rotation of wrist | Dominant | Frequently (34%-66%) | Very Low |
| Flex/extend wrist | Dominant | Frequently (34%-66%) | Very Low |
| Deviate wrist | | | |
| Pinch/grasp with fingers | | | |
| Rubbing hands/arms | | | |
| Pounding | | | |

FIG. 9D

Job Search Results 1200

Client Case Number: 23458034
Client Name: Roger J. Carmichael
County: Philadelphia

| 1202 Match | 1204 Title | 1206 Location | 1208 Company | 1210 Job Analysis |
|---|---|---|---|---|
| 100% | System Operator | Philadelphia, PA | North Telecom | Description |
| 95% | Accounting Clerk | Philadelphia, PA | Amtrak | Plan |
| 87% | Research Filing Assistant | Philadelphia, PA | E-Jets | Plan |

Next three positions

| Job Title: | Clerk/Accounting Clerk: |
|---|---|
| Location: | Philadelphia, Pa |
| Depart/Div/SBU: | Customer Service - Amtrak NorthEast |
| Job Duties: | - Types invoices, forms, memos, documents and correspondence pertaining to personnel or accounting.<br>- Supports all record keeping as assigned both in record logs, accounts, inventories and personal computer.<br>- Maintains records related to entitlements for pay, travel meals reimbursement according to Corporate policy and Agreements negotiated with the unions re pre sting Amtrack Employees<br>- Makes entries in log book on entitlements, hand writing entries on each employee about use of entitlements, vacation, personal holidays, leave, sick leave, military duty, jury duty, and bereavement leave when assigned such duties.<br>- Works within the safety Program guidelines by being alert to physical hazards which affect operations, including modification of, recognition of or cessation of operations. |
| Tasks Performed: | - Maintains working familiarity with the TCU Agreement as it relates to personnel and accounting operations.<br>- Types, files and records accounting transactions, as necessary, distributes selected memos and other |

Job Analysis 1230

Client Case Number: 23458034
Client Name: Roger J. Carmichael
County: Philadelphia

| Match | Title 1234 | Location 1236 | Company |
|---|---|---|---|
| 95% | Accounting Clerk | Philadelphia, PA | Amtrak |

| Deficiency 1232 | Job Requirements | Recruitment Recommendation | Action Taken 1238 |
|---|---|---|---|
| Lift Capacity: 10lbs. | Lift Capacity: 20lbs. | Physical Therapy | NA |
| Aversion to stress: 5 | High Stress: 10 | Stress Reduction Program (two weeks) | NA |
| No Car/Transportation | Position requires transportation to location | Car pool program: Share-A-Ride | NA |

FIG. 13C

METHOD AND SYSTEM FOR MATCHING POTENTIAL EMPLOYEES AND POTENTIAL EMPLOYERS OVER A NETWORK

CROSS-REFERENCE TO RELATED APPLICATIONS

This application claims priority from U.S. Provisional Application No. 60/193,460 filed Mar. 31, 2000, which is incorporated herein by reference.

FIELD OF THE INVENTION

The present invention relates to techniques for matching potential employees with potential employers over a network, and more particularly to matching individuals having "special needs" with potential employers using traditional employment information and non-traditional employment information, e.g., an individual's physical health, behavioral health, social needs and education preparedness.

BACKGROUND ART

Low unemployment has resulted in a limited pool of employable individuals to fill service industry/entry level positions, forcing employers to hire individuals that historically they would never have given a second look, e.g., individuals having special needs. Such individuals can include welfare recipients, ex-offenders, the disabled, homeless, veterans, etc. This has created demand for an efficient method and system for recruiting, training and placing individuals having "special needs" in jobs.

According to the Bureau of Labor Statistics (BLS), as of August 2000 there were approximately 5.6 million unemployed (non-retired, adults, in need of work) individuals, a good number of whom fit the definition of "special needs." Of the employed population, BLS indicates that in 1996 almost 54 million people worked in low-skill occupations, which represents 40% of all individuals employed in the United States. Over time, individuals having "special needs" will be an overwhelming representative of the pool of available labor to fill these jobs due to an extended period of low unemployment. In order to fill these jobs vacancies and retain employees, employers, agencies, and on-line posting services will be forced to alter their current recruitment and training practices.

Current programs initiated towards addressing employing individuals having "special needs" fail to account for an individual's physical health, behavioral health, social needs and educational preparedness for a specific job placement. Moreover, these systems are neither consistent nor technically advanced. Furthermore, these systems do not address the individual's social needs, such as, health benefits, personal interests, family responsibilities (day care/elder care), transportation, physical and psychosocial barriers. Rather, these programs only concentrate on an individual's present condition, education, training, and experience and do not consider the individual's potential as a result of realistic rehabilitation and training programs to help an individual to meet his or her ultimate potential.

SUMMARY OF THE INVENTION

The problems of the prior art are overcome in accordance with one embodiment of the invention by providing an on-line recruitment, job matching and job placement product and service for matching individuals having "special needs" with potential employers over a network using traditional employment information as well as non-traditional employment information, such as an individual's physical health, behavioral health, social needs and educational preparedness by drawing on information stored in a database on a server computer and using best practices methods.

In accordance with an embodiment of the invention, potential employees work with a case worker to submit information on-line to an employee recruitment, job matching and job placement system for matching potential employees with potential employers by looking beyond the obvious in matching individuals to specific jobs. The system takes into consideration such factors as health insurance eligibility, interests, family responsibilities, transportation, physical and psychosocial barriers. Each potential employee has the opportunity to evaluate a select number of opportunities that the potential employee is either qualified to be placed in immediately and/or that would require compliance with a defined placement plan in order to begin work.

As a result of the employee recruitment, job matching and job placement system, potential employees, employers, and the government benefit. Potential employees are able to enter the permanent workforce. In addition some of these employees are able to rehabilitate physical and emotional disabilities, become educated in health, obtain job training and/or are placed in jobs modified to accommodate the employee's disability. Employers are able to fill positions, increase retention because of a more accurate match, and because it provides the opportunity for individual empowerment through the use of detailed placement plans. The government is able to reduce the number of people receiving public assistance (e.g., welfare, social security, Medicaid, etc.), as well as further reduce the unemployment rate.

The employee recruitment, job matching and job placement system is able to place individuals having "special needs" by focusing on what a person can do rather than what they can't do. Physical, social and economic circumstances that were once barriers to employment are acknowledged, accommodated, and managed using the same principles and practices that have proven effective in the fields of disability and disease management, and education and training.

Additional advantages of the present invention will become readily apparent to those skilled in this art from the following detailed description, wherein embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

BRIEF DESCRIPTION OF THE DRAWINGS

FIG. 4 illustrates a screen display of exemplary client demographic type of information.

FIG. 5A illustrates a screen display of an exemplary health history.

FIG. 5B illustrates a screen display of exemplary insurance/health plan information.

FIG. 5C illustrates a screen display of an exemplary pop-up screen.

FIG. 6A illustrates a screen display of an exemplary government assistance summary.

FIG. 6B illustrates a screen display of an exemplary work history.

FIG. 6C illustrates a screen display of an exemplary education and training history.

FIG. 6D illustrates a screen display of exemplary questions to determine the social needs of a potential employee.

FIG. 9B illustrates an exemplary screen display for defining a new job.

FIG. 9D illustrates an exemplary screen display prompting the customer to enter the physical requirements for the job opening.

FIG. 13A illustrates an exemplary screen display of the job search results.

FIG. 13B illustrates an exemplary screen display of the specifics of a job.

FIG. 13C illustrates an exemplary screen display of a job analysis.

DESCRIPTION OF THE INVENTION

The present invention is a employee recruitment, job matching and job placement system and method for matching individuals having "special needs" with potential employers over a network using traditional employment information and non-traditional employment information such as an individual's physical health, behavioral health, social needs and educational preparedness.

Figure 1:
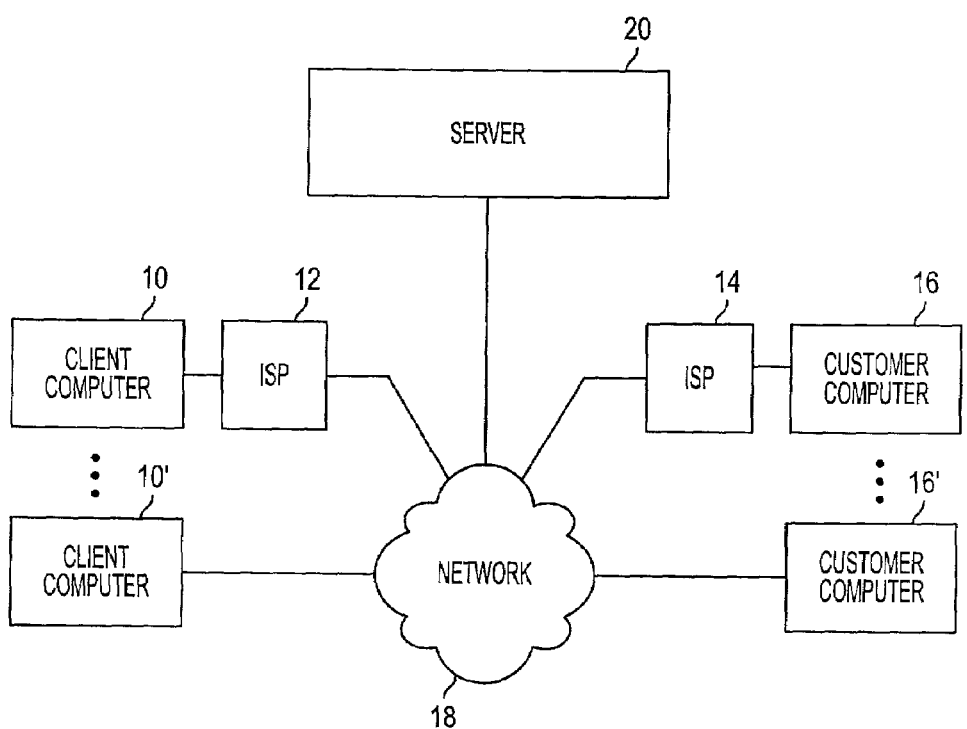
FIG. 1 illustrates a block diagram of a network architecture suitable for carrying data and programs in accordance with some aspects of the invention.

Referring to FIG. 1, a block diagram of a network architecture suitable for carrying data and programs in accordance with some aspects of the invention is illustrated.

As shown, a network 18 serves to connect one or more client computers 10 with the employee recruitment, job matching and job placement system which is hosted on a server 20. The one or more client computers 10' can also connect to the network 18 via a network service provider, such as an internet service provider (ISP) 12. The one or more client computers 10, 10' are used by clients to provide information relating to one or more potential employees, to the server 20. The network 18 also serves to connect one or more customer computers 16 with the employee recruitment, job matching and job placement system hosted on the server 20. The one or more customer computers 16 can also connect to the network 18 via a network service provider, such as an internet service provider (ISP) 14. The one or more customer computers 16, 16' are used to provide information about a job opening for the customer, e.g., potential employer, to the server 20. The server 20 matches potential employees with potential employers.

Figure 2:
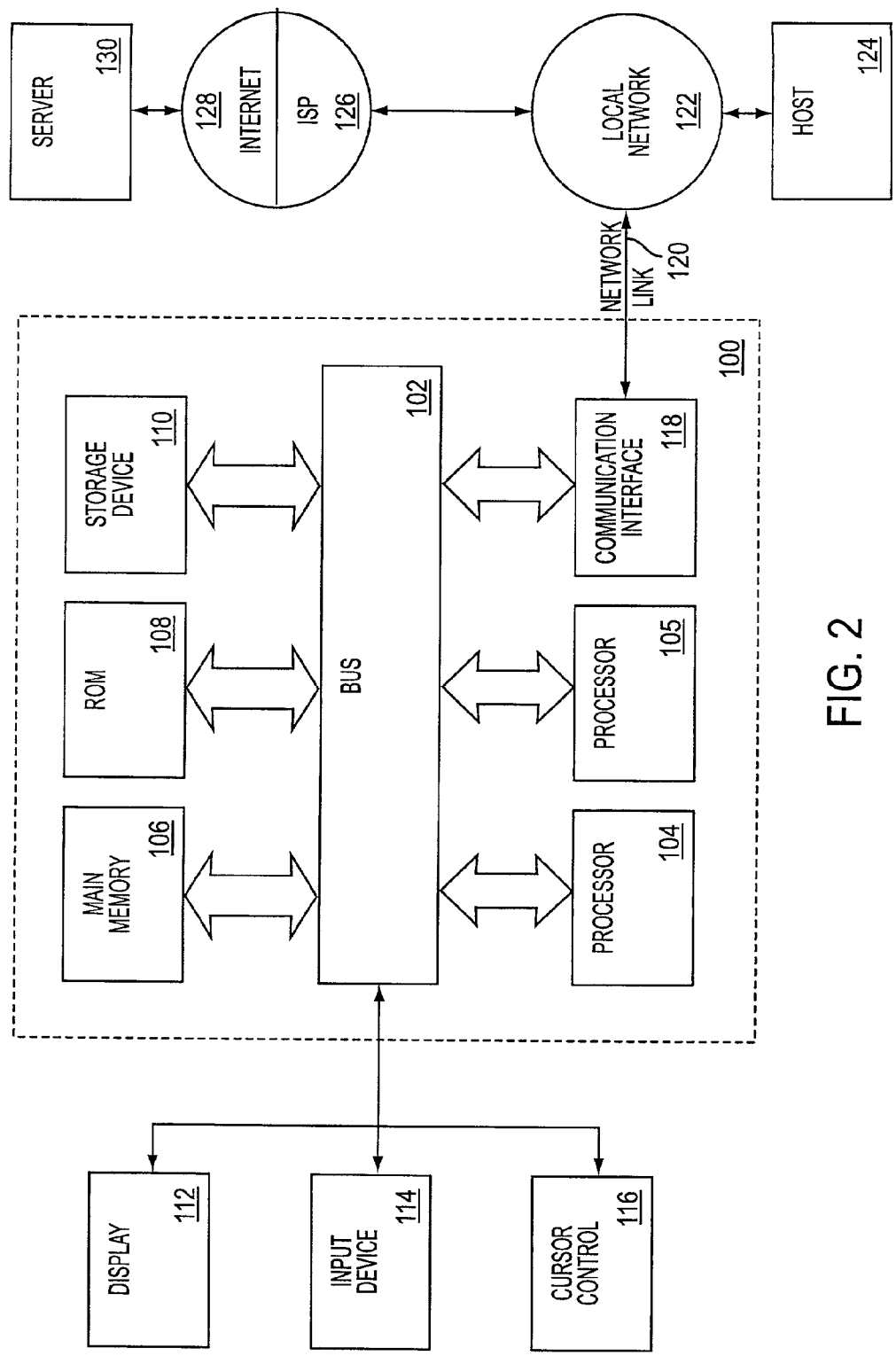
FIG. 2 illustrates a block diagram of an exemplary computer system which could be utilized to carry out an embodiment of the invention.

Referring to FIG. 2, a block diagram of an exemplary computer system which could be utilized to carry out an embodiment of the invention. The computer system 100 can be used for a client computer 10, 10', customer computer 16, 16' and/or the server 20. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 902 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

One embodiment of the invention is related to the use of computer system 100 for obtaining information about one or more potential employees, one or more job openings, and matching one or more potential employees with one or more job openings. According to one embodiment of the invention, the job matching is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors (e.g., 104, 105) in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to a specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a compact disk read only memory (CD-ROM), digital versatile disk (DVD), any other optical medium, punch cards, paper tape, any other physical medium with patterns of holes, a random access memory (RAM), a programmable read only memory (PROM), an electrically programmable read only memory (EPROM), a FLASH electrically programmable read only memory (FLASH-EPROM), any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for trading as described herein. The received code may be executed by processor 104 as it is received, and/or stored in storage device 110, or other non-volatile storage for later execution. In this manner, computer system 100 may obtain application code in the form of a carrier wave.

Figure 3:
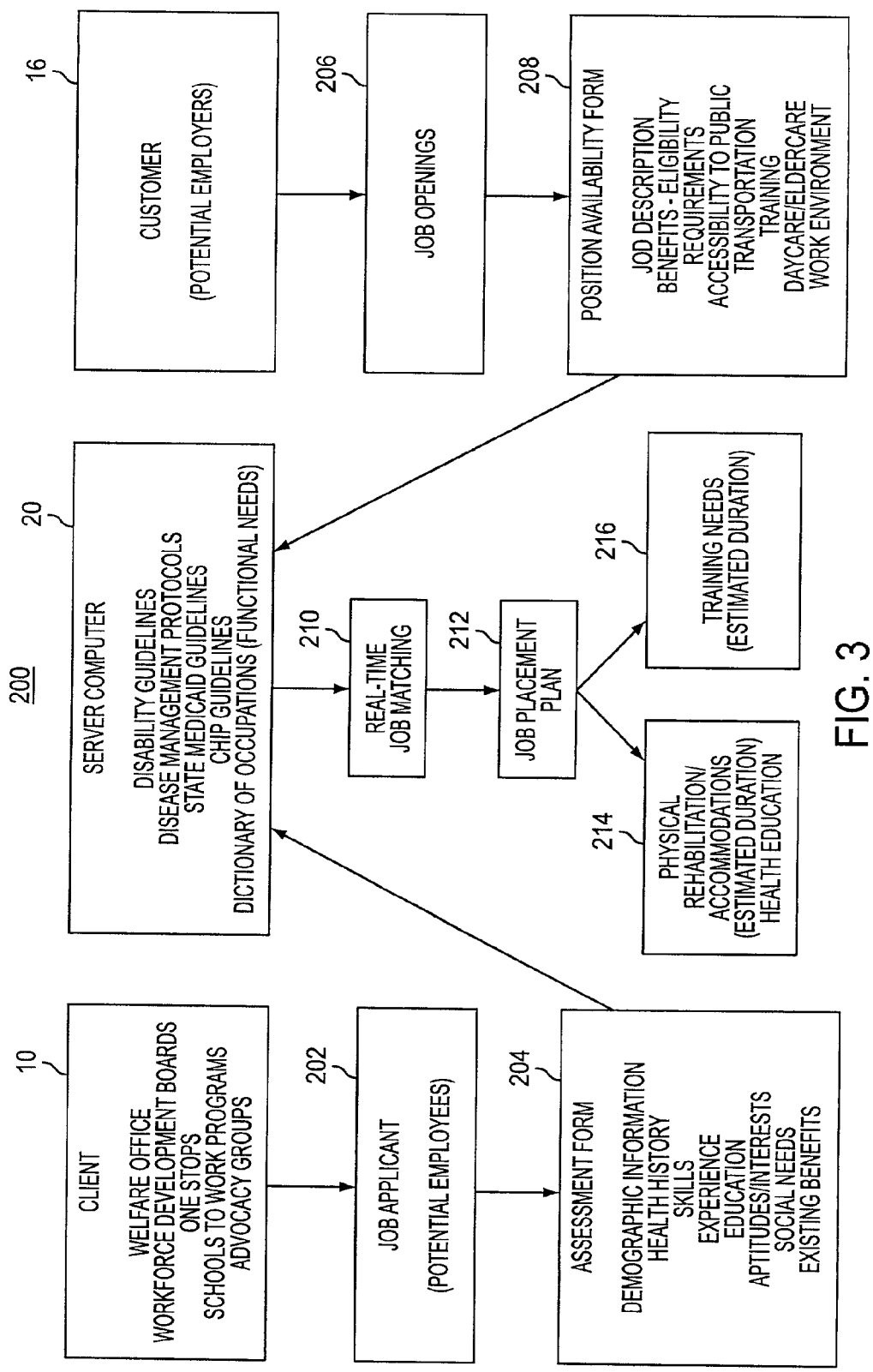
FIG. 3 illustrates a block diagram of a employee recruitment, job matching and job placement system for matching a potential employee with one or more potential employers over a network in accordance with an embodiment of the invention.

Referring to FIG. 3, a block diagram of the employee recruitment, job matching and job placement system for matching potential employee with one or more potential employers over a network in accordance with an embodiment of the invention is illustrated. The left side of the figure illustrates the client side of the employee recruitment, job matching and job placement system 200. Clients 10 are organizations or offices which assist potential employees, e.g., job applicants 202, in finding suitable employment. Examples of clients include, but are not limited to welfare offices, workforce development boards, One Stops, School to Work Programs, Employment Networks, and advocacy groups.

A job applicant 202 meets with a case worker of client 10 who assists in gathering and submitting the traditional employment information and non-traditional employment information to the employee recruitment, job matching and job placement system 200 over the network using the computer system illustrated in FIG. 2. To further assist the case worker, assessment forms 204 are used to gather information. Assessment forms 204 are electronic forms for prompting the case worker to enter information related to the potential employee. The assessment forms 204 can include and are not limited to demographic information, health history, skills, experience, education, aptitudes/interests, social needs, and existing benefits. Where possible, drop-down menus are used to improve efficiency and accuracy.

Referring to FIG. 4, a screen display of exemplary client demographic type of information is illustrated. The demographic information 300 includes, but is not limited to a potential employee's name 302, address 303 including city 304, state 306, and zipcode 308, lock-in status 310, telephone number 312, date of birth (DOB) 314, social security number (SSN) 316, preferred language 318, marital status 320, gender 322, race 324, dependents 326, name of dependents 328, the age of each dependent 330 and relationship of each dependent to the potential employee 332.

Referring to FIGS. 5A–5C, screen displays for gathering health history information for a potential employee are illustrated. FIG. 5A is a screen display of an exemplary health history. The health history 400 provides information concerning any health care the potential employee was the recipient of in the past year. As shown, the case number 402, name of the potential employee 404, name of the primary care provider 406, and name of the health center 408 are displayed. The potential employee is prompted for their health history information which includes, but is not limited to if the potential employee is currently under a provider's care 409, if so, then the name 410, address 412, city 414, state 416, zipcode 418, the date of the last visit to the provider 420, reason for the visit 422, if potential employee received any healthcare treatment in the last 12 months 424 (if so, the date 426 and reason 428), and if the there is a history of any serious illness 430.

Referring to FIG. 5B, a screen display 430 of exemplary insurance/health plan information is illustrated. As shown, the case number 432, potential employee's name 434 and the county 436 the recipient resides in are displayed. The potential employee is prompted for insurance/health plan information 430 which includes, but is not limited to the potential employee's current health plan 438, plan provider number 440, provider type 442, PCP name 444, clinic/hospital group 446, special medical needs 448, medication needs 450, and any other insurance coverage which includes the coverage 452 and policy information 454.

Referring to FIG. 5C, a screen display 460 of an exemplary pop-up screen is illustrated. Pop-up screens 464 are used as part of an expert system for prompting the potential employee for additional information concerning a specific area. As shown, in response to an indication that the potential employee indicated that he or she suffered from lower back pain 462, the potential employee is prompted for additional information specifically concerning the lower back pain. The pop-up screen 464 prompts the potential employee "Do you require lumbar support?" 466 and "Has your doctor told you not to? Bend, Twist, Light Lifting, Medium Lifting, Heavy Lifting, Sit for Prolonged Periods (over 15 minutes) and Sit in vibrating vehicles" 468. The case worker chooses an answer using a radio button.

Referring to FIGS. 6A–6D, exemplary screen displays for gathering client information is illustrated. In FIG. 6A, an exemplary government assistance summary 500 is illustrated. As shown, the recipient's case number 502 and name 504 are displayed. The potential employee is prompted for information concerning if the potential employee is receiving or has received any government assistance 500. The information includes, but is not limited to if the recipient is currently receiving any public assistance 506, type of assistance 508, agency providing the assistance 510, contact name 512, case number 514, beginning date 516 and end date 518 information.

Referring to FIG. 6B, a screen display 520 of an exemplary work history is illustrated. As shown, potential employee's case number 522 and name 524 are displayed. The potential employee is prompted for work history information 520 which includes, but is not limited to the potential employee's last job 526, job requirements 528, if the recipient received any job training 530, the type of training 532, dates of employment 534, duration of employment 536, reason for leaving 538 and if there were any additional problems or issues with the job 540.

Referring to FIG. 6C, a screen display 542 of an exemplary education and training history is illustrated. As shown, the potential employee's case number 544 and name 546 are displayed. The potential employee is prompted for education and training information 542 which includes, but is not limited to potential's highest school grade completed 548, if a diploma or certificate was received 550, the diplomas and/or degrees received 552, if technical training was received 554, the technical training 556, if any other training was received 558, and the other training 560.

Referring to FIG. 6D, a screen display of exemplary questions to determine the social needs of a potential employee is illustrated. As shown, the case number 564, client name 566 and county 568 where the potential employee resides is displayed. The social needs or personal information 562 which the potential employee is prompted to enter includes, but is not limited to "How do you keep busy during the day?" 570, "Do you have access to a car?" 572, "Do you live near public transportation?" 574, "Are you responsible for the care of a child under the age of five?" 576, "Are you responsible for the care of another adult?" 578, and "How often in the last week have you felt?" 580 with the case worker selecting one or more symptoms from a drop-down menu.

Figure 7:
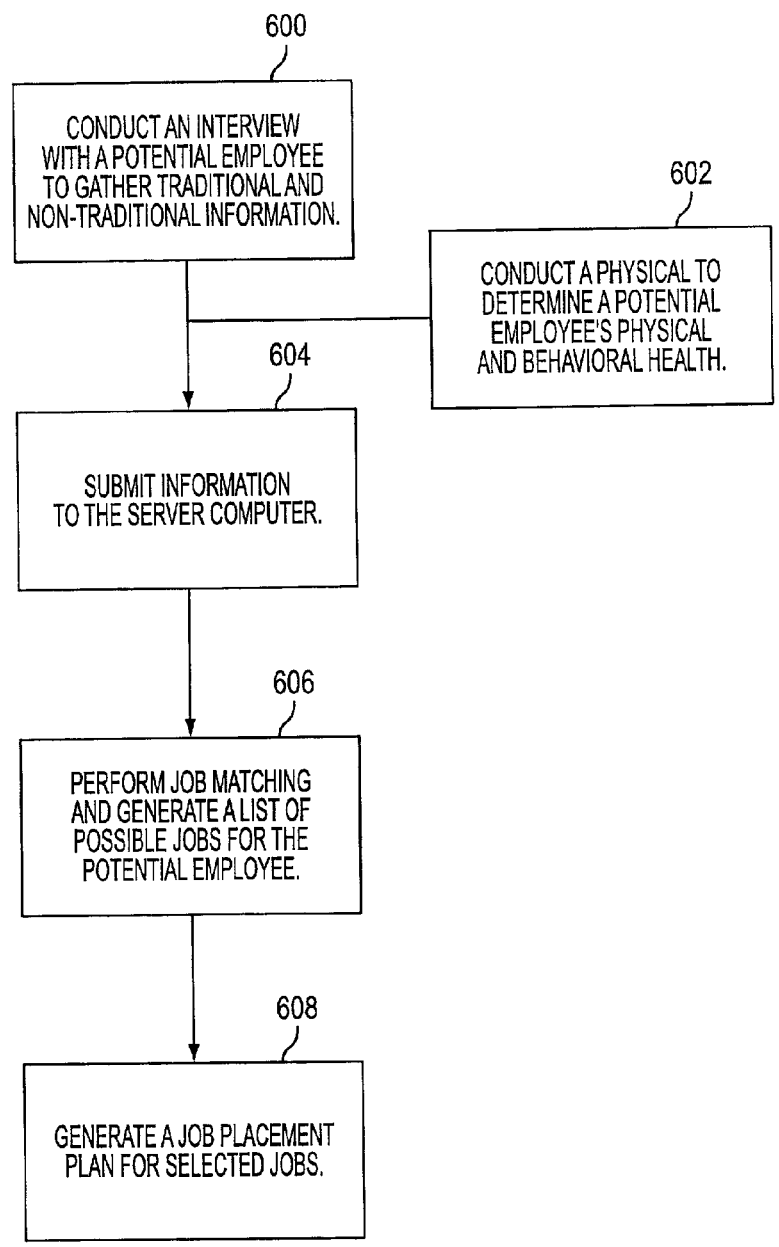
FIG. 7 illustrates a block diagram illustrating an exemplary process for gathering and submitting information related to a potential employee in accordance with an embodiment of the invention.

Referring to FIG. 7, a block diagram illustrating an exemplary process for gathering and submitting information related to a potential employee in accordance with an embodiment of the invention. At step 600, an interview is conducted to gather traditional and non-traditional information from a potential employee. Typically, a case worker gathers this information from the potential employee. As discussed earlier with respect to FIGS. 4–6D, the case worker uses the assessment forms to gather the necessary case information. The interview includes questions directed to the potential's employee's physical health, behavioral health, social needs and educational preparedness for a specific job placement. Social needs include questions directed to, but not limited to the potential employee's health benefits, personal interests, family responsibilities (day care/elder care), transportation, physical and psychosocial barriers. Educational preparedness includes questions directed to, but not limited to the potential employee's work history and training, education, and job skills.

At step 602, the case worker has access to the results of the potential employee's medical history and results of a physical performed by a licensed health provider to determine the potential employee's capabilities. Typically, in instances of disability a licensed health provider performs a physical examination to determine the physical health of the potential employee and generates a physical profile. In some cases, the licensed health provider performs a behavioral health examination to determine the behavioral health status of the potential employee and generates a behavior health profile. As a result, the profile includes, but is not limited to the potential employee's physical health, behavioral health, and functional limitations. This step is optional and is used when a potential employee has a physical or mental disability that may inhibit the potential employee from gainful employment. In addition, the primary care provider also indicates whether the potential employee is permanently disabled and unemployable or temporarily disabled thereby triggering specific indicators in the placement plan.

At step 604, the gathered information is submitted to the server computer. The case worker sends the traditional and non-traditional information to the server computer over the network. In some cases, state welfare departments can send physical profiles to the employee recruitment, job matching and job placement system.

At step 606, the employee recruitment, job matching and job placement system performs job matching and generates a list of potential jobs for a potential employee.

At step 608, the employee recruitment, job matching and job placement system generates a job placement plan for the potential employees, if necessary. The job placement plans can include rehabilitation plans, health education information, and job training along with the estimated duration for each.

Referring to FIG. 3 again, the right side of the figure illustrates the customer side of the system. The customer side of the system includes one or more customers, e.g., potential employers, which use a computer system as illustrated in FIG. 2 to post job openings 206. The employers 16 use position availability forms 208 to post job openings 206. Typically, the position availability forms 208 are directed to gathering information about a job opening 206 such as a job description, benefits and eligibility, job requirements, accessibility to public transportation, training, daycare/eldercare, and work environment. Where possible, drop-down menus are used to improve efficiency and accuracy.

Figure 8:
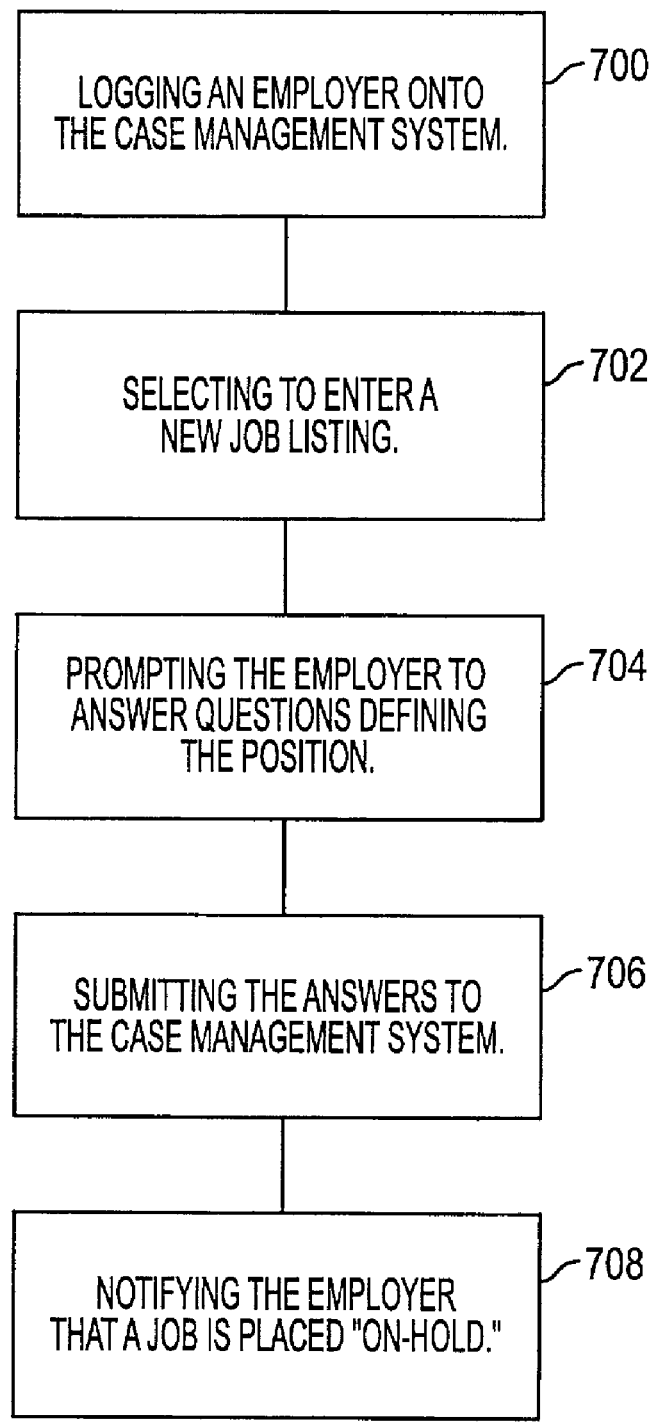
FIG. 8 illustrates a block diagram of an exemplary process for posting a new job in accordance with an embodiment of the invention.

Referring to FIG. 8 a block diagram illustrating an exemplary process for posting a new job in accordance with an embodiment of the invention. At step 700, a worker with an organization that hires employees or places applicants, e.g., a potential employee, logs onto the employee recruitment, job matching and job placement system.

Figure 9A:
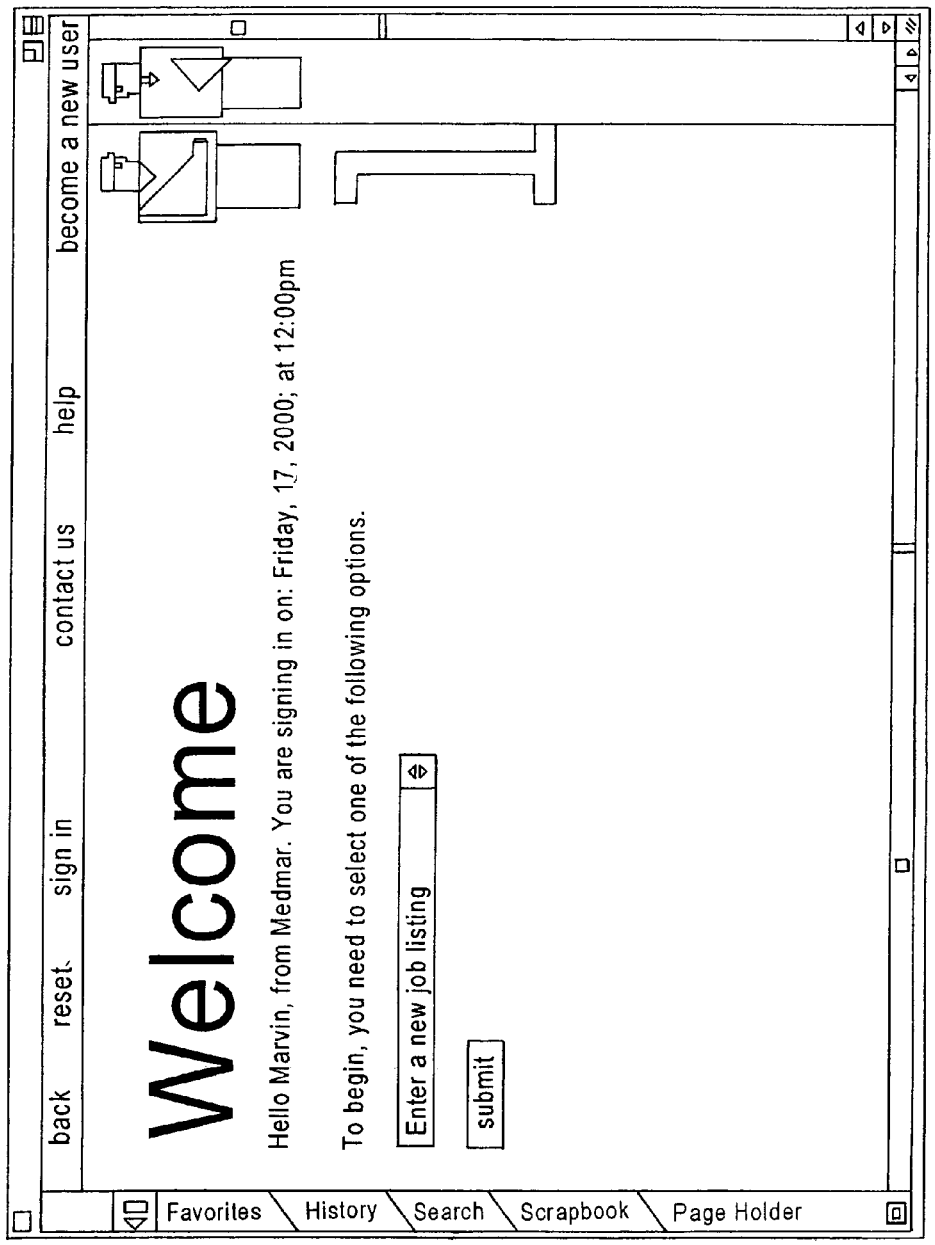
FIG. 9A illustrates an exemplary screen display for posting a job listing.

At step 702, the customer chooses "Enter a new job listing" using a pull-down menu and clicking "submit." A new job is opened with a unique system number and a job number specific to the employer being assigned to the new job. Referring to FIG. 9A, an exemplary screen display for posting a job listing is illustrated.

Figure 9C:
FIG. 9C illustrates an exemplary screen display prompting the employer to enter the educational and technical skills required for the job opening.

At step 704, the customer is prompted to answer a series of questions that help define the job that is being posted. Position availability forms are used to assist the customer in providing the necessary information. The information obtained from the position availability forms includes, but is not limited to job description, benefits-eligibility, requirements, accessibility to public transportation, training, daycare/eldercare, work environment, etc. FIGS. 9B–9D are exemplary screen displays of the position availability forms.

Referring to FIG. 9B, an exemplary screen display for defining a new job is illustrated. As shown, the company name 802 is displayed. The employer is prompted to enter information including, but not limited to company location 804, department 806, job title 808, date the job 810 is available. The employer is prompted to answer a series of questions that help define the job that is being posted, as well as define the specific requirements. For example, the employer is prompted to "Please select the description below which most closely resembles the physical requirements of the position:" 812. Using radio buttons, the employer selects the description that best describes the physical requirements for the position.

Referring to FIG. 9C, an exemplary screen display prompting the employer to enter the educational and technical skills required for the job opening is illustrated. As shown, the company name 820 and job title 822 are displayed. The information the employer is prompted to enter includes, but is not limited to the minimum education the position requires 824, minimum skills the position requires 826, and knowledge of software packages that the position requires 828.

Referring to FIG. 9D, an exemplary screen display prompting the customer to enter the physical requirements for the job opening is illustrated. For example, the customer enters the body side 852, frequency 854, and pace 856 for a required action 850 needs to be performed by an employee.

At step 706, the customer submits the information in order to post the job opening and the customer waits for a match.

At step 708, the employer is notified that the job is logged as "on-hold" when a potential employee requests an interview and the employer will be contacted to schedule a time to meet the applicant. Typically, the notification to the employer is in the form of an email, although other traditional notification methods can be utilized, such as a telephone call or a letter.

Figure 10:
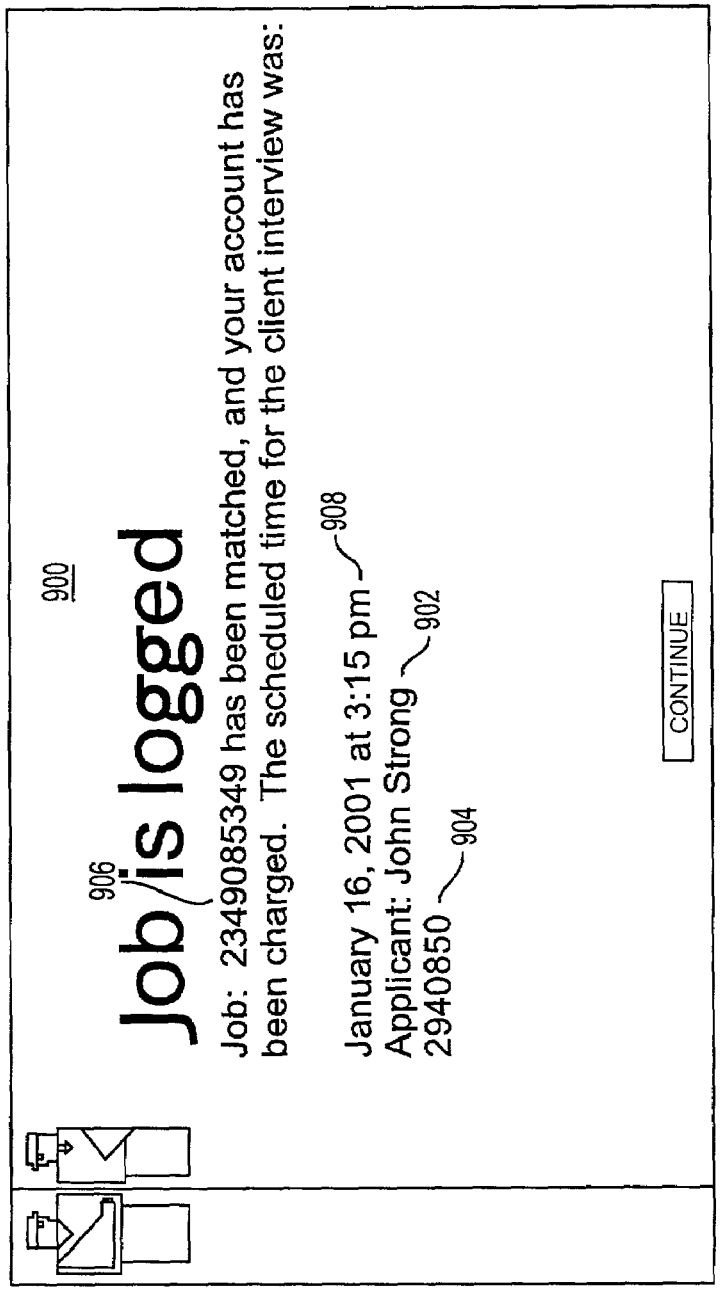
FIG. 10 illustrates an exemplary screen display of a notification email.

Referring to FIG. 10, an exemplary screen display of a notification email is illustrated. The notification 900 contains such information as the applicant's name 902, employee recruitment, job matching and job placement system number 904, employer's job number 906, time for the interview 908, and that the employer's account has been charged.

Figure 11:
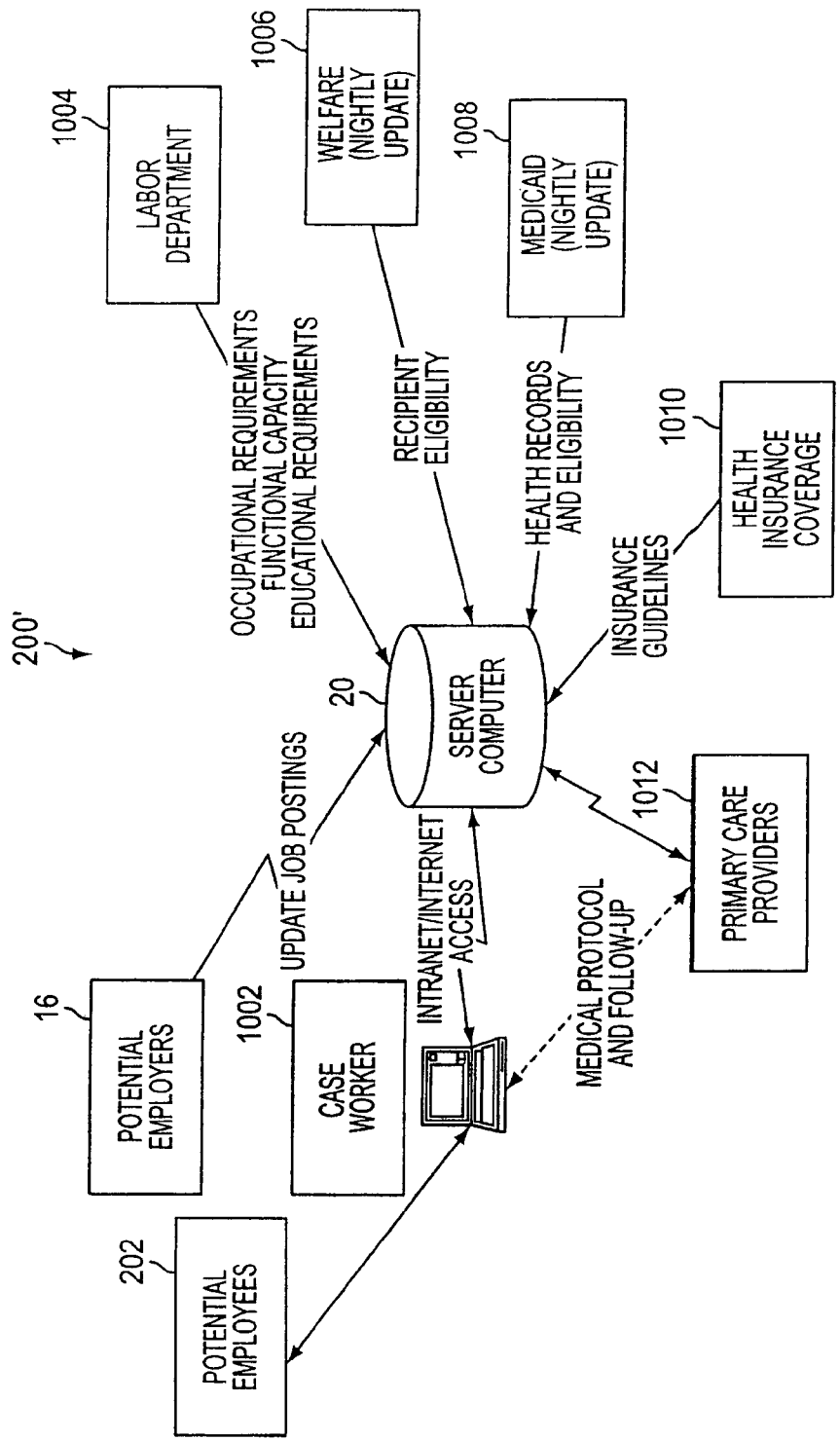
FIG. 11 illustrates a block diagram of the various parties involved in matching a potential employee with a potential employer using an embodiment of the invention.

Referring to FIG. 11, a block diagram of the various parties involved in matching a potential employee with a potential employer using an embodiment of the invention is illustrated. As shown, several parties provide information over a network to the server computer 20 comprising one or more servers of the employee recruitment, job matching and job placement system 200. The parties providing information to the server computer 20 include, but are not limited to the following, case workers 10, potential employers 16, labor department 1004, welfare office 1006, Medicaid 1008, health insurance 1010, and primary care providers 1012. In addition, other parties such as job placement specialists, vocational rehabilitation specialists, social workers, etc. can also provide information to the server computer 20 which acts as a data warehouse for the information. Protection is taken to ensure that employers do not have unauthorized access to a potential employee's private information, such as physical health and behavioral health information.

The case worker 1002 of client 10, as explained above assists the potential employee 202 in gathering and submitting information related to the potential employee 16 to the server computer 20. In addition, the case worker 1002 receives and provides information from primary care providers 1012 to the server computer 20.

Potential employers 16 post and update the job openings posted on the server computer 20. When potential employers 16 submit job descriptions, the potential employers 16 may be required to identify eligibility requirements for their employee benefit programs, including group health insurance. The employee recruitment, job matching and job placement system 200 uses this information to cross-reference eligibility guidelines related to Medicaid 1008 and other government assistance programs in order to identify situations that may cause a potential employee to become uninsured.

The labor department 1004 (e.g., the U.S. Labor Department) provides occupational requirements, functional capacity and educational requirements to the server computer 20. For example, the US Department of Labor, NCCI and other nationally recognized organizations have standardized descriptions of occupational requirements such as physical capabilities heavy, light, sedentary), education, and standard skill sets for a comprehensive array of jobs and occupations. Drawing on these national standardized descriptions, the employee recruitment, job matching and job placement system 200 compiles a database to cross-reference available jobs with the capabilities and vocational training needed of potential employees. Moreover, universal job classification codes or occupational codes from the department of labor can also be used. In addition, the employee recruitment, job matching and job placement system 200 uses criteria to define skills and/or functionalities required for regular full-time, regular part-time, or modified duty positions.

The welfare office 1006 provides eligibility information for potential employees to the server computer 20. The eligibility information is used by the employee recruitment, job matching and job placement system 200 to determine if the potential employee 202 is still eligible for welfare if the potential employee takes a selected position.

Medicaid 1008 provides health records and eligibility for potential employees 1002 to the server computer 20. The eligibility information is used by the employee recruitment, job matching and job placement system 200 to determine if the potential employee 202 is eligible for Medicaid if the potential employee takes a selected position.

The health insurance companies 1010 provide insurance guidelines for potential employees 202 to the server computer 20. The insurance guidelines are used by the employee recruitment, job matching and job placement system 200 to determine if a potential employee 202 qualifies for insurance and to provide gap insurance to a potential employee 202 who loses his or her insurance benefits as a result of being employed and do not qualify for insurance under the employer's insurance.

Primary care providers 1012 provide results from medical examinations, follow-up appointments, and profiles to the server computer 20. The information from the primary care providers 1012 is used by the employee recruitment, job matching and job placement system 200 to determine if a potential employee requires physical rehabilitation or health education. In some cases, the physical rehabilitation or health education recommendations are considered in the job matching process.

The information received from the various parties can be used to automatically fill in the forms illustrated in FIGS. 4–6D. For example, if a potential employee is receiving public assistance, then their demographic information would be automatically entered in the system backfilling information found in FIG. 4.

Referring to FIG. 3 again, the employee recruitment, job matching and job placement system 200 uses the information stored in the server computer 20 from the client (case worker) 10, customer (employer) 16, labor department 1004, welfare 1006, Medicaid 1008, health insurance coverage 1010, and primary care providers 1012 to perform job matching. The employee recruitment, job matching and job placement system 200 performs real-time job matching 210 by matching a potential employee with one or more employers and generates a list of potential jobs with corresponding matching percentages. As shown, information is obtained using the assessment forms 204 and the position availability forms 208.

Figure 12:
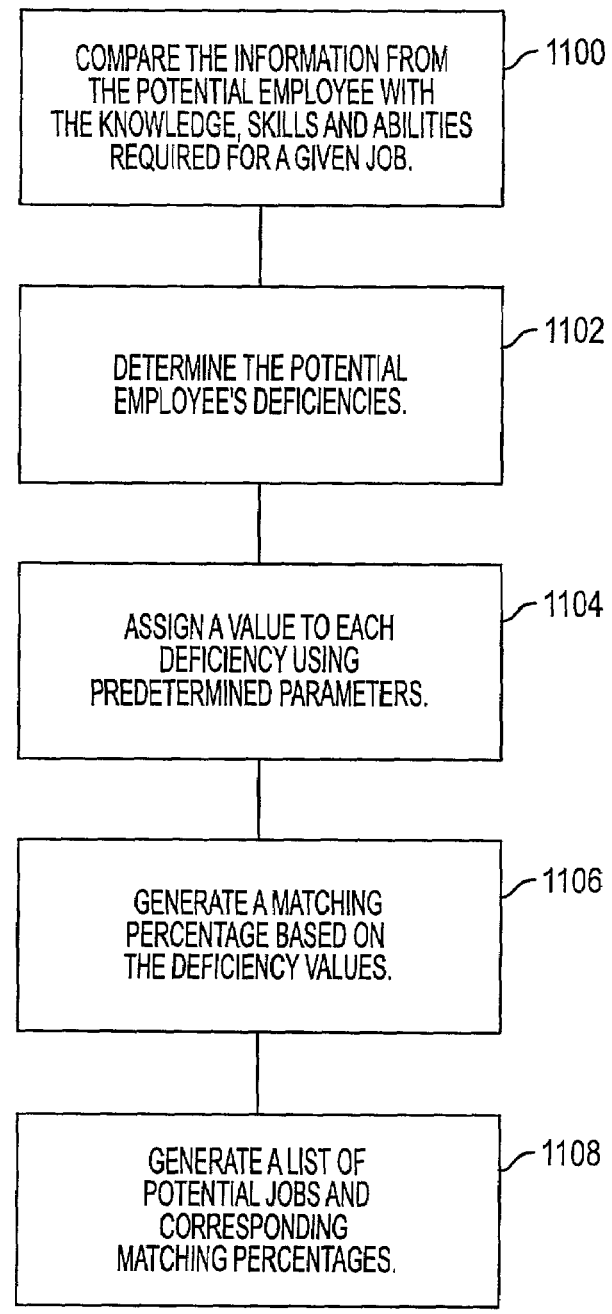
FIG. 12 illustrates a block diagram of an exemplary process for job matching in accordance with an embodiment of the present invention.

Referring to FIG. 12, a block diagram of an exemplary process for job matching in accordance with an embodiment of the present invention is illustrated. The employee recruitment, job matching and job placement system uses "best match criteria" to match an available pool of employees with their optimal opportunity for sustained employment based on available jobs. At step 1100, the employee recruitment, job matching and job placement system compares the information received from potential employee (through the case worker) with the knowledge, skills, and abilities for the given job. The knowledge, skills, and abilities for the given job come from either the labor department and/or from the potential employer using the position assessment forms.

At step 1102, the employee recruitment, job matching and job placement system determines the potential employee's deficiencies based on the comparison of the information received from the potential employee with the knowledge, skills, and abilities for the given job. For example, if the information received from the potential employee indicates that an employee can only lift 10 pounds and the information from the potential employee or the required physical ability requirements as defined by the labor department for a specific job requires an employee to lift 20 pounds, then the potential employee cannot perform all of the required job functions in his or her present physical health. Thus, the potential employee is deficient in his or her physical ability to perform all of the requirements for the given job.

At step 1104, the employee recruitment, job matching and job placement system assigns a value for each deficient using predetermined parameters. The predetermined parameters can be ruled based or determined by the potential employer and the employee recruitment, job matching and job placement system. For example, a person's physical ability to lift a given weight can be valued more in a manual labor position than a receptionist position, thus the predetermined parameter would be worth more for the former.

At step 1106, the employee recruitment, job matching and job placement system generates a matching percentage based on the deficiency values. The matching percentage provides an indication of whether a potential employee meets the knowledge, skills, and ability requirements for a given job. The better an employee can perform the job requirements, the better the matching percentage. Thus, the matching percentage is the percentage that the information from the potential employee that matches the knowledge, skills and abilities provided by the potential employer and or job requirements from the labor department.

At step 1108, the employee recruitment, job matching and job placement system generates a list of potential jobs and corresponding matching percentages. Referring to FIG. 13A, an exemplary screen display of the job search results is illustrated. As shown, the job search results 1200 include a match percentage 1202, job title 1204, location of the job 1206, name of the company 1208 and if a job analysis 1210 is available. The case worker and potential employee review the list to determine which opportunities the potential employee is interested in.

Referring to FIG. 13B, an exemplary screen display of the specifics of a job is illustrated. The job specific screen 1220 is accessed by clicking on a specific job listed in FIG. 13A. The specifics of a job include information related to the job duties 1222 and tasks performed 1224 for the specific job being displayed.

Referring to FIG. 13C, an exemplary screen display of a job analysis is illustrated. By clicking on the matching percentage in FIG. 13A, a job analysis screen 1230 including the deficiencies 1232, job requirements 1234, recruitment recommendation 1236 and the action taken 1238 are displayed. The information in the job analysis is derived from the information the potential employer entered when prompted for the job requirement information illustrated in FIGS. 9A–9D. The job analysis 1230 and job specifics 1220 information assist a potential employee in deciding which position to interview. Using this information, a case worker works with the potential employee to identify the most appropriate opportunity, flag it in the system and initiates the placement plan process.

Figure 14:
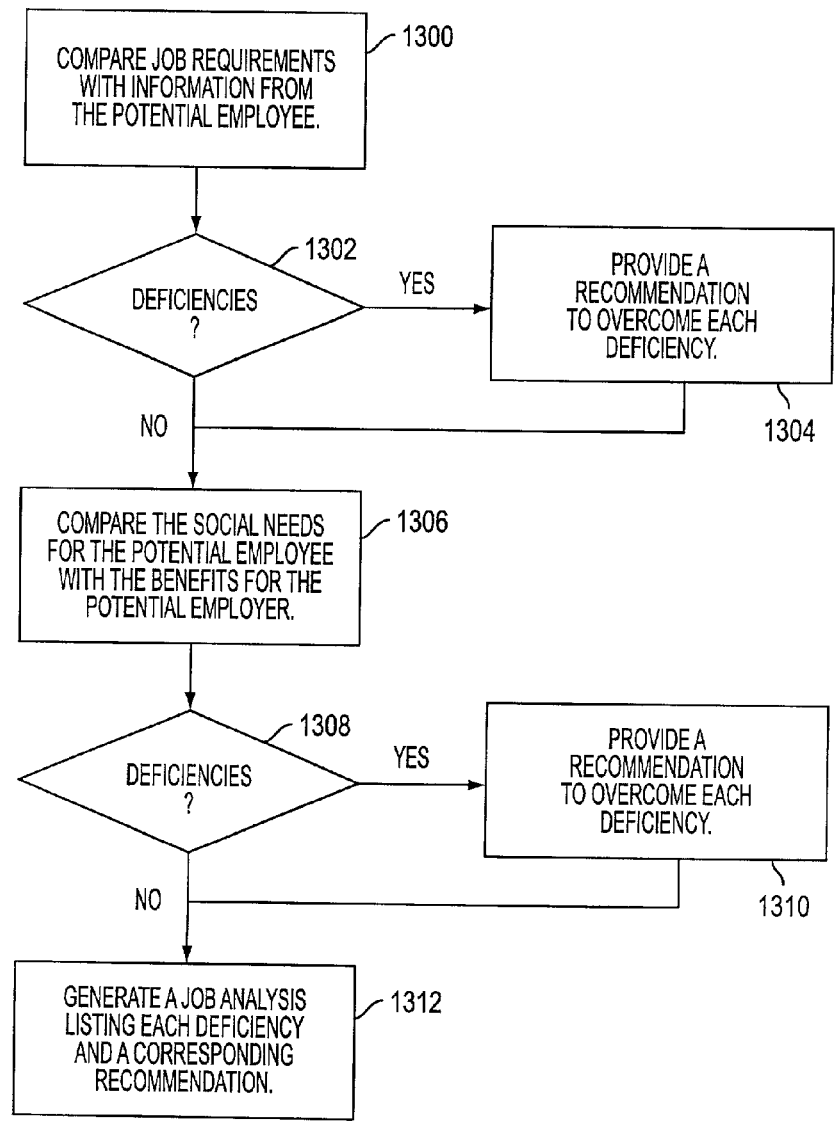
FIG. 14 illustrates a block diagram of an exemplary process for generating a job analysis display in accordance with an embodiment of the present invention.

Referring to FIG. 14, a block diagram of an exemplary process for generating the job analysis display in accordance with an embodiment of the present invention is illustrated. At step 1300, the employee recruitment, job matching and job placement system uses the employee recruitment, job matching and job placement system compares the information received from potential employee (through the case worker) with the knowledge, skills, and abilities for the given job.

At step 1302, the employee recruitment, job matching and job placement system determines the potential employee's deficiencies based on the comparison of the information received from the potential employee with the knowledge, skills, and abilities for the given job.

At step 1304, the employee recruitment, job matching and job placement system provides a recommendation to overcome each deficiency identified in step 1302. The employee recruitment, job matching and job placement system uses a rule based system to provide the recommendations and can also include recommendations from the primary care provider. For example, as illustrated in FIG. 13C, if a potential employee is deficient in that he or she does cannot lift the required capacity to meet the job requirement, the recommendation would be to have the potential employee receive physical therapy. If the job is a high stress position and the potential employee has an aversion to stress, then the recommendation would be for the potential employee to attend a stress reduction program.

At step 1306, the employee recruitment, job matching and job placement system determines the potential employee's deficiencies with respect to social needs by comparing the information received from the potential employee concerning the potential employee's social needs with the benefit information received by the potential employer.

At step 1310, the employee recruitment, job matching and job placement system provides a recommendation to overcome each deficiency identified in step 1308. For example, as illustrated in FIG. 13C, if a potential employee is deficient in that he or she does not have a car for transportation to and from the office, the recommendation would be to have potential employee participate in a car pool program. A mapping program embedded in the system can assist in determining options for providing public transportation or other ride alternative solutions. For example, the mapping program can include bus stop information thereby assisting in determining if public transpiration is an option in assisting the potential employee.

At step 1312, the employee recruitment, job matching and job placement system generates the job analysis listing (as illustrated in FIG. 13C) listing each deficiency, job requirement, and a recommendation to resolve the deficiency.

Figure 15:
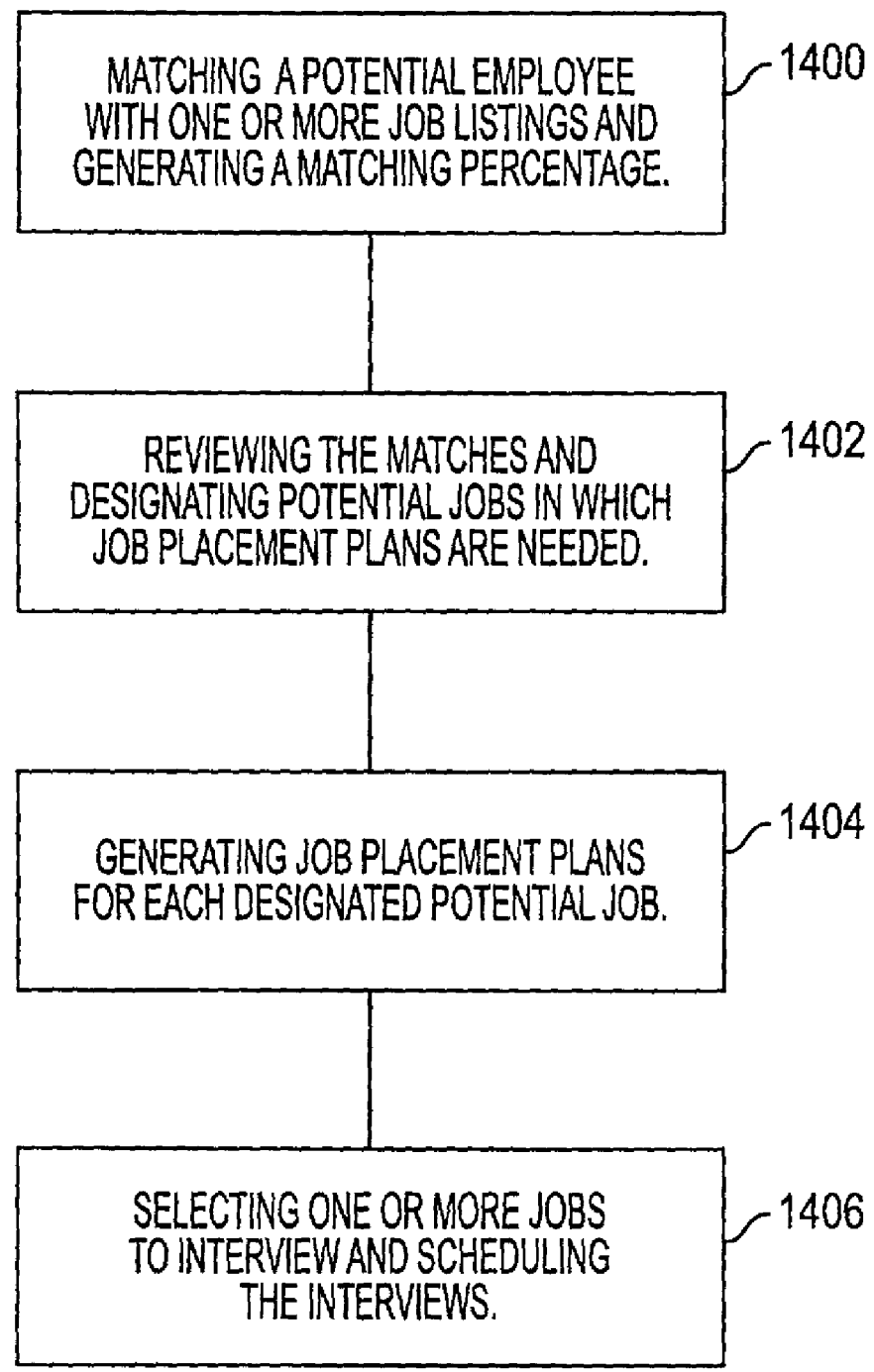
FIG. 15 illustrates a block diagram for an exemplary process for assisting the potential employee in finding employment in accordance with an embodiment of the present invention.

Referring to FIG. 15, a block diagram for an exemplary process for assisting the potential employee in finding employment in accordance with an embodiment of the present invention is illustrated. At step 1400, the potential employee is matched with one or more job opportunities and corresponding matching percentages are generated. At step 1402, the case worker and potential employee review the potential jobs and designate potential jobs in which job placement plans (212 in FIG. 3) are needed.

At step 1404, the employee recruitment, job matching and job placement system generates a job placement plan for each designated potential job. Using the information from the job analysis, the employee recruitment, job matching and job placement system generates a job placement plan listing the requirements that the potential employee needs to do in order to perform the duties of a given job. The job placement plan can include, but is not limited physical rehabilitation needs, accommodations, and health education (214 in FIG. 3) which the applicant needs, as well as skill training and the estimated duration for the training (216 in FIG. 3). Thus, the potential employee not only has a potential job, but also a plan to achieve the knowledge, skills, and ability to perform a job which can be considered an "upgraded" job. As a result, the potential employee has a vested interest in upgrading his or her position, as well as loyalty to the employer for providing the opportunity.

At step 1406, the case worker and potential employee select one or more job openings for the potential employee to interview with the case worker calling and scheduling an interview for the potential employee. The client can go right from the office to see the prospective employer. An interview is conducted thus enabling the employer to determine the potential employee's ability for the job. If agreed upon, the employer provides the potential employee with a temporary job and necessary training until the potential employee leaves the position or becomes a permanent employee. Ideally, the potential employee enters the permanent workforce in a fulfilling job and leaves the welfare roll. In addition, the employee recruitment, job matching and job placement system can monitor the status of the potential employee's employment status to track retention, the origin of the referral, and the time between the referral and active employment (post training). In addition, the employee recruitment, job matching and job placement system is designed to capture and report outcomes.

In the preceding detailed description, the present invention is described with reference to specifically exemplary embodiments thereof. It will, however, be evident that various modifications and changes may be made thereto without departing from the broader spirit and scope of the present invention, as set forth in the claims. The specification and drawings are, accordingly, to be regarded as illustrative and not restrictive. It is understood that the present invention is capable of using various other combinations and environments and is capable of changes or modifications within the scope of the inventive concept as expressed herein.

What is claimed is:

1. A method for matching a potential employee with a potential employer using a client computer and at least one customer computer connected to at least one server via a network, comprising the steps of:

entering information at the client computer comprising both traditional employment information and non-traditional employment information for the potential employee;

transferring to said at least one server via said network both said traditional employment information and non-traditional employment information for the potential employee;

at each customer computer of a potential employer having a job opening, entering position information regarding the job opening;

transferring to said at least one server via said network the position information regarding the job opening to post a job listing;

comparing at said at least one server the received information comprising both said traditional employment information and non-traditional employment information for the potential employee with the position information for all job listings that have been posted by all potential employers;

generating at said at least one server a list of job listings of potential jobs for the potential employee based on the comparison; and transferring to said client computer via said network the list of job listings of potential jobs for the potential employee for display, wherein said traditional employment information includes at least one of education, training and experience of the potential employee, the non-traditional employment information is directed to social needs of the potential employee, and the position information regarding the job opening includes minimum education required, occupational requirements and at least one of functional capacity, benefits and social needs comprising accommodations.

2. The method of claim 1, wherein the social needs of the potential employee to which the non-traditional employment information is directed include at least one of health benefits, personal interests, family responsibilities, transportation, physical barriers, and psychosocial barriers.

3. The method of claim 1, wherein the the non-traditional employment information includes physical and behavioral health information of the potential employee.

4. The method of claim 1, further comprising the step of: generating at said at least one server a matching percentage for each job listing, wherein the matching percentage is the percentage of both said traditional employment information and non-traditional employment information for the potential employee matching said position information for said each job listing, and
the displayed transferred list of job listings of potential jobs for the potential employee includes the corresponding matching percentages for said each job listing on the list of job listings of potential jobs for the potential employee.

5. The method of claim 4, further comprising the step of generating at said at least one server a job placement plan for the potential employee in response to receiving an indication that a job listing on the list of job listings of potential jobs for the potential employee is selected, wherein
the job placement plan for the potential employee includes information from the group consisting of physical rehabilitation plans, physical rehabilitation accommodations, health education, and training needs.

6. The method of claim 4, further comprising the step of placing an indication that a selected job listing is on hold in response to receiving an indication that an interview for the selected job listing is requested by the potential employee.

7. The method of claim 6, further comprising the step of sending an email message to the potential employer that an interview is requested by the potential employee.

8. An employee recruitment, job matching and job placement system for matching a potential employee with a potential employer over a network, the system comprising:
a network;
a client computer for entering information comprising both traditional employment information and non-traditional employment information for the potential employee;
at least one customer computer, each for entering position information regarding a job opening of a potential employer; and
at least one server computer connected to the client computer and said at least one customer computer via the network, said at least one server computer configured to:
receive from the client computer via the network the information comprising both traditional employment information and non-traditional employment information for the potential employee,
receive from said at least one customer computer via the network the position information regarding each job opening for each potential employer to post a job listing for said each job opening,
compare the received information comprising both traditional employment information and non-traditional employment information for the potential employee with the position information for all job listings that have been posted by all potential employers,
generate a list of job listings of potential jobs for the potential employee based one the comparison, and
transfer to said client computer via said network the list of job listings of potential jobs for the potential employee for display, wherein
said traditional employment information includes at least one of education, training and experience of the potential employee,
the non-traditional employment information is directed to social needs of the potential employee, and
the position information regarding the job opening includes minimum education required, occupational requirements and at least one of functional capacity, benefits and social needs comprising accommodations.

9. The employee recruitment, job matching and job placement system of claim 8, wherein the social needs of the potential employee to which the non-traditional employment information for the potential employee is directed comprise information from the group consisting of health benefits, personal interests, family responsibilities, transportation, physical barriers, and psychosocial barriers.

10. The employee recruitment, job matching and job placement system of claim 8, wherein the non-traditional employment information for the potential employee comprises physical and behavioral health information of the potential employee.

11. The employee recruitment, job matching and job placement system of claim 10, further comprising a primary care provider information source for providing the physical and behavioral health information over the network to said at least one server computer.

12. The employee recruitment, job matching and job placement system of claim 8, wherein said at least one server computer is further configured to generate a matching percentage for each job listing, wherein
the matching percentage is the percentage of both said traditional employment information and non-traditional employment information for the potential employee matching said position information for said each the job listing, and
the displayed list of job listings of potential jobs for the potential employee includes the corresponding matching percentages for said each job listing on the list of job listings of potential jobs for the potential employee.

13. The employee recruitment, job matching and job placement system of claim 8, wherein
said at least one server computer is further configured to generate a job placement plan in response to receiving an indication from the client computer that a job listing on the list of potential jobs for the potential employee is selected, and
the job placement plan includes information from the group consisting of physical rehabilitation plans, physical rehabilitation accommodations, health education, and training needs.

14. The employee recruitment, job matching and job placement system of claim 13, wherein said at least one server computer is further configured to determine if the potential employee is eligible for public assistance based on eligibility guidelines received over the network from a public assistance type of office based on the selected job.

15. The employee recruitment, job matching and job placement system of claim 13, wherein said at least one server computer is further configured to determine if the potential employee is eligible for Medicaid based on health records and eligibility guidelines received over the network from a Medicaid office based on the selected job.

16. The employee recruitment, job matching and job placement system of claim 13, wherein said at least one server computer is further configured to determine if the potential employee is eligible for gap insurance base on insurance guidelines received over the network from an insurance company based on the selected job.

17. The employee recruitment, job matching and job placement system of claim 13, wherein said at least one server computer is further configured to place an indication with respect to a job listing that the job listing is on hold in response to receiving an indication that an interview for said job listing is requested by the potential employee.

18. The employee recruitment, job matching and job placement system of claim 17, wherein said at least one server computer is further configured to send an email message informing a potential employer of the interview request by the potential employee.

19. The employee recruitment, job matching and job placement system of claim 8, wherein at least a portion of the position information requirements information is received over the network from a labor department type of office.

20. A computer-readable medium bearing instructions for matching a potential employee with a potential employer over a network, said instructions being arranged to cause one or more processors upon execution thereof to perform the steps of:
receiving information from a client computer comprising both traditional employment information and non-traditional employment information for the potential employee;
receiving from at least one customer computer position information regarding a job opening for a potential employer to post a job listing;
comparing the received information comprising both said traditional employment information and non-traditional employment information for the potential employee with position information for all job listings that have been posted by all potential employers;
generating a list of job listings of potential jobs for the potential employee based one the comparison; and
transferring the list of potential jobs for the potential employee to the client computer for display, wherein
said traditional employment information includes at least one of education, training and experience of the potential employee,
the non-traditional employment information is directed to social needs of the potential employee, and
the position information regarding the job opening includes minimum education required, occupational requirements and at least one of functional capacity, benefits and social needs comprising accommodations.

21. The computer-readable medium according to claim 20, wherein the social needs of the potential employee to which the non-traditional employment information is directed comprise information from the group consisting of health benefits, personal interests, family responsibilities, transportation, physical barriers, and psychosocial barriers.

22. The computer-readable medium according to claim 20, wherein the non-traditional employment information comprises physical and behavioral health information of the potential employee.

23. The computer-readable medium according to claim 20, further comprising the step of generating a matching percentage for each job listing, wherein
the matching percentage is the percentage of both said traditional employment information and non-traditional employment information for the potential employee matching said position information for said each job listing, and
the displayed transferred list of job listings of potential jobs for the potential employee includes the corresponding matching percentages for said each job listing on the list of job listings of potential jobs for the potential employee.

24. The computer-readable medium according to claim 23, further comprising the step of generating a job placement plan for the potential employee in response to receiving an indication that a job listing on the list of job listings of potential jobs for the potential employee is selected, wherein the job placement plan for the potential employee includes information from the group consisting of physical rehabilitation plans, physical rehabilitation accommodations, health education, and training needs.

25. The computer-readable medium according to claim 23, further comprising the step of placing an indication that a selected job listing is on hold in response to receiving an indication that an interview for the selected job listing is requested by the potential employee.

26. The computer-readable medium according to claim 25, further comprising the step of sending an email message to the potential employer that an interview is requested by the potential employee.

* * * * *